Aug. 21, 1962   C. E. WILKENS ET AL   3,050,035
BRAKE BOOSTER VALVE
Filed July 29, 1960   2 Sheets-Sheet 1

INVENTORS.
Carl E. Wilkens
Millard W. Keller, Jr.
BY
Arthur L. Nelson
Attorney

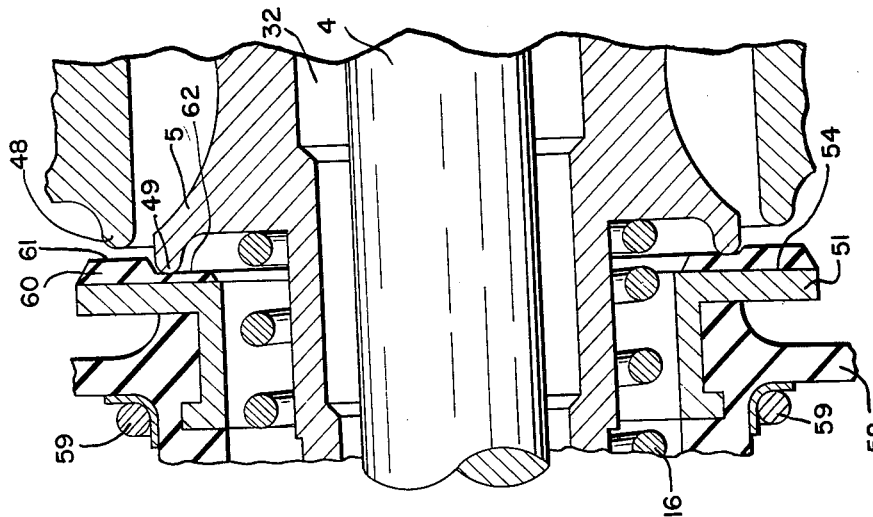
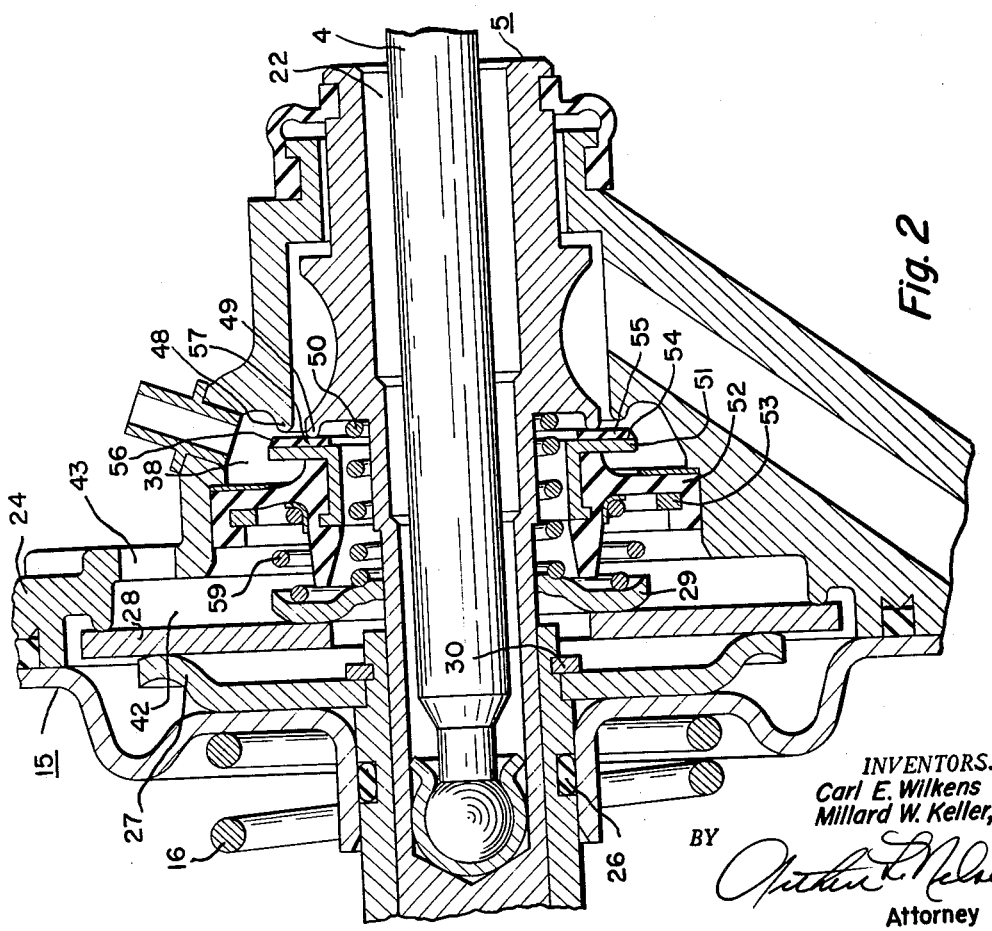

United States Patent Office 3,050,035
Patented Aug. 21, 1962

3,050,035
BRAKE BOOSTER VALVE
Carl E. Wilkens and Millard W. Keller, Jr., Dayton, Ohio, assignors to General Motors Corporation, Detroit, Mich., a corporation of Delaware
Filed July 29, 1960, Ser. No. 46,122
9 Claims. (Cl. 121—41)

This invention relates to a brake booster unit and more particularly to a valve means for operation in combination with a brake booster unit.

The operation of a brake booster unit requires the use of differential pressure fluids operating against a power wall for pressurizing hydraulic fluid for actuation of vehicle brakes. The booster unit includes a power wall having a differential pressure acting on the power wall in response to a manual control means operating a valve arrangement. For satisfactory operation of the booster unit, it is important that the valve means operate smoothly to provide a well regulated flow of the differential fluids to the compartments formed by the power wall.

It has been found that in operating a valve arrangement employing concentric valves operating on a valve seat having a common planar surface that a slight tilting of the plane of contact for the low pressure valve relative to the high pressure valve provides an improved operation of the valve means. This is accomplished by providing a tilting action of the valves as the low pressure valves and the high pressure valves are seated and unseated during operation of the booster unit. Accordingly, this invention is intended to provide this improved operation of the valve means in combination with a booster unit.

It is an object of this invention to provide a valve means wherein the low pressure valve is not unseated coaxially with the opening of the high pressure valve and vice versa.

It is another object of this invention to provide a valve means for a booster unit wherein the plane of contact of the low pressure valve is non-parallel with the plane of contact of the high pressure valve.

It is a further object of this invention to provide in a valve means for a booster unit either the low pressure and high pressure valve seats on non-planar surfaces or the low pressure or high pressure valve elements on non-parallel planes to prevent total and simultaneous seating and unseating of the low pressure and high pressure valve means when the booster unit is operated.

The objects of this invention are accomplished by employing concentric low pressure valve means and high pressure valve means which have the plane of contact non-parallel to each other. This may be accomplished either by placing the valve seats on non-planar surfaces or otherwise providing the low pressure and high pressure valve elements located on planes which are non-parallel and in this manner the tilting valve action is provided during operation of the valve means.

The valves as disclosed in this invention are concentric poppet valves wherein the high pressure valve is manually operated and operating against a valve seat member to unseat the low pressure valve element for operation of the booster unit. As the air valve element engages the valve seat member, the valve seat member is engaged on one side of the high pressure valve element thereby tilting the valve seat from the same side on the low pressure valve element. The low pressure valve element is thereby disengaged by a tilting action of the high pressure valve element as the valve element is moved forward manually. This manner of operating the valves prevents sticking of the valve elements with the valve seats.

The reverse situation is true as the manual operating means is retracted, the low pressure valve element tilts the valve seat member from the high pressure valve element thereby preventing simultaneous engagement of a low pressure element with the low pressure valve seat and disengagement of the high pressure valve element from the high pressure valve seat. The tilting action provides smoother operation of the valves to prevent sticking of the valve elements with the valve seat upon engagement and disengagement of the valve means.

Further objects and advantages of the present invention will be apparent from the following description, reference being had to the accompanying drawings wherein preferred embodiments of the present invention are clearly shown.

In the drawings:

FIGURE 2 is a cross-section view wherein the valve elements lie on planar surfaces which are non-parallel.

FIGURE 3 is a cross-section view wherein the valve seats lie on planes which are non-parallel with each other.

Figure 1:
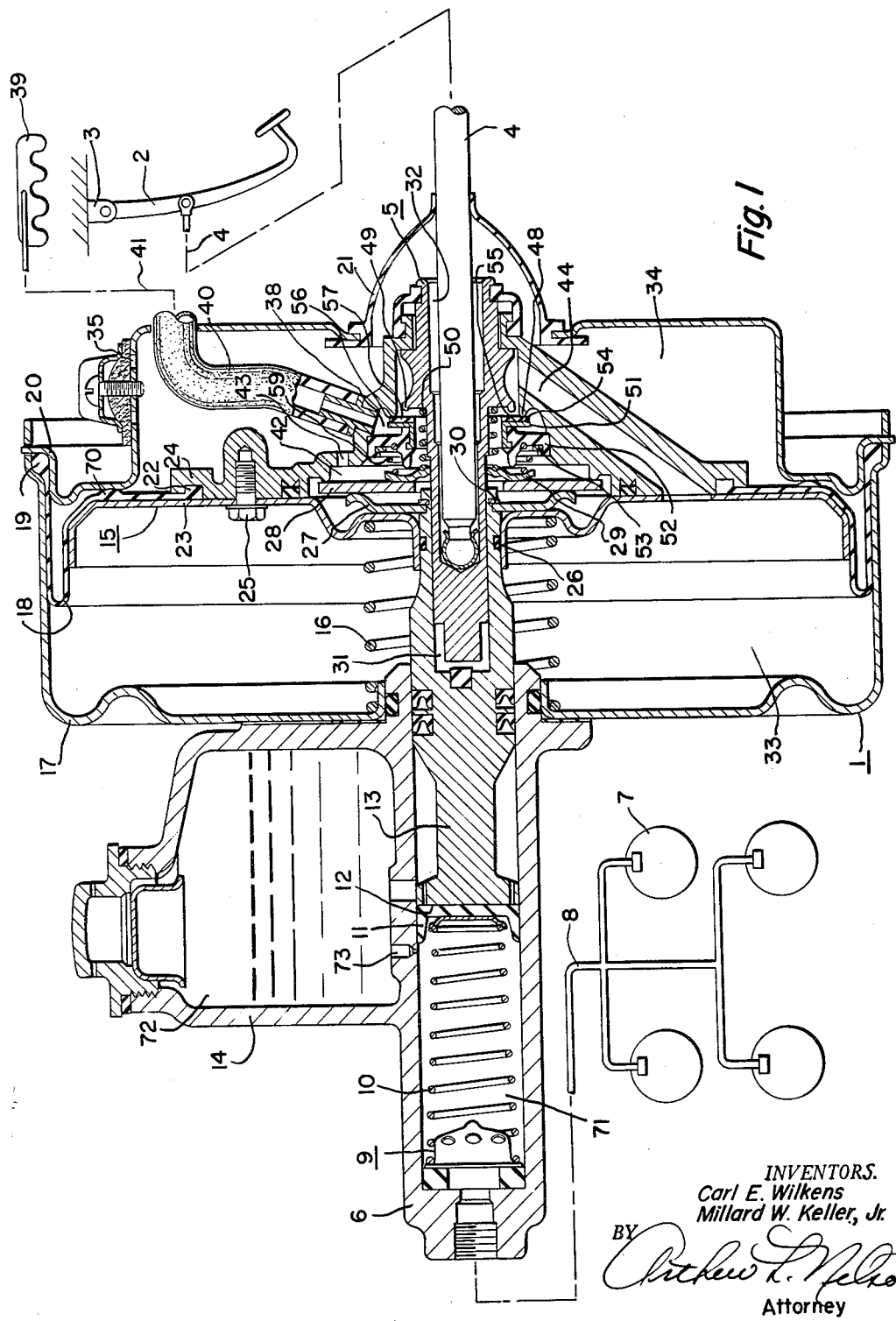
FIGURE 1 is a cross-section view of a booster unit and a manual means for operating the unit.

Referring to FIGURE 1, the booster unit 1 is operated by the manual means including the brake pedal 2 which is pivotally mounted to the chassis 3. The brake pedal 2 is pivotally connected to the push rod 4 which extends forwardly through a concentric opening on the rearward end of the air valve member 5.

The booster unit 1 pressurizes fluid in the master cylinder 6 which is connected to a plurality of vehicle wheel brakes 7 through the conduit means 8. The forward end of the master cylinder 6 receives a check valve assembly 9 retained in its position by the spring 10 which biases the seal 11 to a position on the forward facing 12 of the master piston 13.

The master cylinder 6 is formed of unitary casting including the reservoir 14. The casting is mounted on the forward end of the booster unit 1. The power wall 15 within the booster unit 1 is connected to the master piston 13 and biased to a rearward position by the return springs 16.

The booster unit 1 is formed with the forward casing 17 connected to the master cylinder 6. The power wall 15 includes a rolling diaphragm 18 forming a bead 19 on its outer periphery which is sealed between the forward casing section 17 and the rearward casing section 20. The rearward casing section 20 is connected to a boot 21 on its inner periphery which extends radially inward to receive the push rod 4 and forming a seal of the rearward end of the booster unit 1.

The booster unit 1 includes a power wall 15. The power wall operates in combination with the diaphragm 18 which has a bead 22 formed on its inner periphery for reception within the diaphragm support 23 and the valve housing 24. The diaphragm support 23 and the valve housing 24 are fastened by means of a plurality of bolts 25. The diaphragm support 23 extends radially inward to receive the rearward end of the master piston 13 which is sealed by the O-ring seal 26.

Concentrically mounted within the power wall 15 is a reaction means including a reaction plate 27 and a plurality of levers 28 and a reaction disk 29 for transmitting the reaction force from the master piston 13 to the air valve member 5. The reaction plate 27 is retained on the rearward end of the master piston 13 by the snap ring 30. The forward end of the air valve member 5 extends forwardly and is received within a concentric opening 31 at the rearward end of the master piston 13. A central opening 32 formed in the rearward end of the valve member 5 receives the push rod 4 which provides actuating force in operation of the booster unit.

The power wall 15 forms a variable pressure compartment 33 forward of the power wall and a constant pressure compartment 34 rearward of the power wall. A constant pressure compartment 34 is in communication with the atmosphere at all times through the port 35. The variable pressure chamber 33 contains air when the power wall 15 is in its rearwardly retracted position and is evacuated when the booster unit is in operation.

A vacuum cavity 38 is formed within the valve housing 24 which is in communication with the source of vacuum 39 through the flexible hose 40 and the conduit means 41.

The air cavity 42 is in communication with the constant pressure chamber 34 through the port 43 at all times. The air cavity 42 is also in communication with the passage 44 and the variable pressure chamber 33 when the booster unit is in the retracted position.

The valve housing 24 forms an annular ridge 48 within the inner periphery of the housing operating as the vacuum valve element. A concentric ridge 49 is also formed concentrically on the air valve member 5. The air valve element is biased to a rearward position by the air valve spring 50 compressibly operating between the air valve member 5 and the reaction disk 29.

The valve seat member 51 is supported by a valve seat diaphragm 52 which is retained within the inner periphery of the valve housing by a snap ring 53. The valve seat diaphragm extends radially inward to receive the valve seat member 51. A radial planar surface 54 forms a mounting surface for the rubber annulus 55 which forms the vacuum valve seat 56 and the air valve seat 57. The vacuum valve seat being mounted on the valve seat member 51 is biased to a contacting position to the vacuum valve element 48 by the valve seat spring 59. This is the normal position for the vacuum valve seat 56 when the booster unit is in the retracted position.

The air valve member 5 is normally biased in spaced relation to the air valve seat 57 when the booster unit is in its retracted position. In this position, it can be seen that the variable pressure chamber 33 and the constant pressure chamber 34 are filled with air of atmospheric pressure.

FIGURE 2 is an enlarged cross-section view of the valve means which are centrally located in the power wall 15. The air valve element 49 is moved to a forward position contacting the air valve seat 57 and the vacuum valve element 48 is in spaced relation to a vacuum valve seat 56. The disclosure of FIGURE 2 illustrates where the annulus 55 forms a common planar surface for the air valve seat 57 and the vacuum valve seat 56. The planar contacting surface of the air valve is non-parallel relative to the contacting surface of the vacuum valve. It can be seen that when the brakes are retracted, that the planar surface of the annulus 55 will engage only a portion of the vacuum valve element 48 prior to engagement of the full contacting surface of the vacuum valve element 48. In this manner, a tilting action is provided as the air valve element is retracted as the vehicle brakes are retracted. The same situation is true as the air valve member 5 is moved forwardly and engages the common planar surface of the annulus 55.

Referring to FIGURE 3, the air valve member 5 forms a ridge 49 in a planar surface which is parallel to the planar surface including the contacting surface of the vacuum valve element 48. The annulus 60 forms non-planar surfaces which operate as the vacuum valve seat 61 and the air valve seat 62. It can be seen that the annulus 60 will engage the leading edge of the vacuum valve element 48 prior to engagement of the trailing edge of the annulus upon retraction of the air valve element when the vehicle brakes are retracted. The operation of the device shown in FIGURES 3 and 2 are otherwise the same except for the location of the non-parallel surfaces.

The operation of the valve means will be described in the following paragraphs. As the brake pedal 2 is depressed, the push rod 4 is moved axially forward within the booster unit. FIGURE 1 illustrates the normally retracted position prior to movement of the push rod 4 in response to movement of the manual lever 2. The variable pressure chamber 33 is in communication with a constant pressure chamber 34 through the passage 44 and the air cavity 42 and port 43. The biasing force of the return spring 16 moves the power wall 15 rearwardly where the annular bead structure 70 contacts the rearward casing section 20 when the power wall is in its normally retracted position. The vacuum cavity 38 is in constant communication with the source of vacuum 39 through the flexible hose 40 and the conduit means 41. The pressurizing chamber 71 of the master cylinder 6 is in communication with the reservoir chamber 72 through the port 73.

As the push rod 4 moves forwardly within the booster unit 1, the air valve member 5 moves forwardly to engage the air valve seat. Referring to FIGURE 2, the air valve seat 57 comes in contact with the annular ridge 49 on the air valve member 5. The forward facing formed by the annular ridge 49 lies on a plane non-parallel with the engaging surface of the vacuum valve element 48. As the air valve member 5 moves forwardly, the lower portion of the ridge 49 engages the air valve seat 57. This provides a tilting action of the valve seat member 51 thereby lifting a lower portion of the vacuum valve seat 56 from the vacuum valve element 48 prior to the opening of the upper portion of the vacuum valve seat 54 from the vacuum valve element 48. Upper and lower portions of the valve as described are merely for illustration and could be located on a point of the periphery of the valve. The tilting action of the valve seat member 51 prevents the vacuum valve element 48 from sticking as the vacuum valve means is opened. In the position of the valve means as shown in FIGURE 2, the vacuum cavity 38 is in communication with the passage 44 and the variable pressure chamber 33 forward of the power wall 15. In this position, the variable chamber 33 is evacuated due to the fluid connection to the source of vacuum 39. The power wall 15 moves forwardly carrying the master piston 33 forwardly within the master cylinder 6. The fluid in the pressurizing chamber 71 is compressed and further forward movement of the master cylinder 13 actuates the plurality of vehicle brakes through the conduit means 8. It is noted that the valve seat element 51 is permitted to cock itself axially with the axis of the booster unit due to the supporting action of the valve seat diaphragm 52 and the resilient biasing force of the spring 59. The inclination of the planar surface of the annulus 54 rights itself with the contacting surface lying in the plane formed by the air valve element 49.

The contacting surfaces of the air valve element 49 as it engages the planar surface forming the air valve seat 57 on the annulus 54 are coincidental when the air valve element is in the closed position with the air valve seat 57. The coincidental planes formed by the contacting surface on the air valve element 49 on the air valve seat 57 are non-parallel with the plane formed on which the contacting surface of the vacuum valve element 48 lies.

As the vehicle brakes are released, a brake pedal 2 is permitted to return rearwardly with the push rod 4 and the air valve member 5. The return movement of the air valve member 5 permits a reseating of the vacuum valve seat 57 with the vacuum valve element 48. The hold position, however, is an intermediate position wherein neither the air valve element 49 nor the vacuum valve element 48 is fully seated on their corresponding contacting surface on the annulus 54. In this position, an equalizing condition is present wherein the vacuum from the vacuum cavity 38 equalizes the air pressure from the air chamber 42 and no movement is realized on the power wall 15. It is pointed out that the views disclosing the non-parallel relationship of the air and vacuum valve elements are exaggerated to clarify the basic feature of this invention. For this reason, it is understandable that although the air valve is not completely open and does contact a portion of its mating air valve seat 57 and also the vacuum valve element 48 is not completely closed but also contacts a portion of its mating vacuum valve seat 55, that equalizing conditions may be present and a limited transfer of high pressure and low pressure fluid is present in this position which is the hold position for the booster unit.

A further retraction of the brake pedal 2 permits rearward movement of the air valve and complete disengagement of the ridge 49 of the air valve member 5 with the air valve seat 57. In this position, the vacuum valve seat 55 engages the full periphery of the vacuum valve element 48 and the vacuum valve is completely closed as the air valve completely opens. Further rearward movement of the air valve merely increases the opening between the air valve element 49 and the air valve seat 57.

From the description of the operation in the above paragraph, it can be seen that the contacting surface of the air valve element 49 lies in a plane non-parallel with the contacting surface of the vacuum valve element 48. The movement of the air valve element cocks the valve seat member 51 as the valve seat 55 is unseated from the vacuum valve element 48. During this cocking action, the vacuum valve element 48 is initially released from a vacuum valve seat 55 on a small portion of its contact periphery which provides for a smooth operation in opening of the vacuum valve. The small portion of the vacuum valve element is initially opened due to the tilting action of the valve seat member. This provides a more accurate control of the evacuation of the variable pressure chamber 33 from the vacuum cavity 38 as the vacuum valve has a more sensitive control than when the complete contacting surface of the vacuum valve element 48 is suddenly released.

The same situation is true for the air valve element 57 as the vacuum valve element 48 disengages the valve seat member 51 as the air valve 5 moves rearwardly. The same action is present for opening of the air valve and permitting air to flow into the variable pressure chamber 33 under these conditions. It can be seen that by having a contacting surface in a plane non-parallel with each other that this tilting action provides a more sensitive control and prevents the sticking of the valves in opening in response to the valve control means.

FIGURE 3 discloses an annulus 60 wherein planar surfaces 61 and 62 are non-parallel with each other. In this condition, the contacting surface of the vacuum valve element 48 and the air valve element 49 are parallel to each other. The action in the operation of the valves is in the same manner as described for FIGURE 2. The disclosure shown in FIGURE 3 provides a means wherein a booster unit employing parallel valve surfaces may be altered to include a valve arrangement described in this invention. The change will be incorporated on the vacuum valve seat which is a replaceable element of the booster unit and will provide the same improved operation as described in this invention.

While the embodiments of the present invention as herein disclosed constitute preferred forms, it is to be understood that other forms might be adopted.

What is claimed is as follows:

1. A valve means for operation in combination with the brake booster unit including, a booster unit casing, a power wall operating within said booster unit forming a variable pressure chamber, a constant pressure chamber, a source of low pressure fluid having controlled communication through said valve means to said variable pressure chamber, a source of high pressure fluid in communication with said constant pressure chamber, manual means for operating said valve means, said valve means comprising a valve seat member, a low pressure valve seat supported on said valve seat member, a high pressure valve seat supported on said valve seat member, manually operated high pressure valve element for engaging said high pressure valve seat, means biasing said high pressure valve element normally in spaced relation to said high pressure valve seat, a low pressure valve element for engaging said low pressure valve seat, means for biasing said low pressure valve seat to a normally contacting position with said low pressure valve element, a contacting surface on said high pressure valve element lying in a plane which is non-parallel with a plane including the contacting surface of said low pressure valve element to prevent coaxial alignment during opening of said low pressure valve element with the closing of said high pressure valve element when said booster unit is operated.

2. A valve means for operation in combination with the brake booster unit including, a booster unit including a power wall separating said unit into a constant pressure chamber, and a variable pressure chamber, a source of high pressure fluid in constant communication with said constant pressure chamber, a source of low pressure fluid in communication with said variable pressure chamber through the valve means, said valve means including a manually operated air valve element, a vacuum valve element mounted adjacent to said air valve element, a valve seat member coaxially located with said air valve element, a vacuum valve seat supported on said valve seat member, an air valve seat mounted on said valve seat member for engaging said air valve element, biasing means to normally bias said air valve element in spaced relation to said air valve seat, biasing means on said valve seat member to normally bias said vacuum valve seat to a contacting position with said vacuum valve element, a contacting surface on said air valve element lying on a plane non-parallel with a plane including a contacting surface on said vacuum valve element to provide a tilting action of said valve seat member upon actuation of said valve means when said booster unit is operated.

3. A valve means for operation in combination with a brake booster unit including, a brake booster having a power wall forming a variable pressure chamber and a constant pressure chamber, a source of high pressure fluid in communication with said constant pressure chamber, a source of low pressure fluid in controlled communication with said variable pressure chamber through said valve means, said valve means including a manually operated high pressure valve element, a valve seat member located coaxial with said high pressure valve element, a high pressure valve seat supported on said valve seat member, a low pressure valve seat supported on said valve seat member, a low pressure valve element coaxially located for engagement with said low pressure valve seat on valve seat member, means for biasing said valve seat member to a position where said low pressure valve seat normally contacts said low pressure valve element, means for biasing said high pressure valve element in spaced relation to said high pressure valve seat, a contacting surface of said high pressure valve element lying in a plane non-parallel to a plane including the contacting surface of said low pressure valve element thereby providing a tilting action of the valve seat member when said valve means is operated for the control of operation of said brake booster unit.

4. A valve means for operation in combination with a brake booster unit including, a booster unit having a power wall dividing the interior portion of said booster unit in a variable pressure chamber and a constant pressure chamber, a member connected to said power wall adapted for doing work, a source of high pressure fluid in communication with said constant pressure chamber, a source of low pressure fluid in controlled communication with said variable pressure chamber through said valve means, said valve means including a manually operated high pressure valve element, a valve seat member mounted coaxial with said high pressure valve element, a high pressure valve seat and a low pressure valve seat mounted on said valve seat member, a low pressure valve element located coaxially with said low pressure valve seat, means for biasing said valve seat member to a position where said low pressure valve seat is in a contacting position with said low pressure valve element, means for biasing said high pressure valve element in spaced relation to said high pressure valve seat, a valve seat contacting surface on said high pressure element lying in a plane non-parallel to a valve seat contacting surface of said low pressure valve element to provide a tilting action of said valve seat member when said high pressure valve element is operated manually for controlling the operation of said booster unit.

5. A valve means for operation in combination with a brake booster unit including, a booster unit having a power wall dividing the interior portion of said booster unit in a constant pressure chamber and a variable pressure chamber, a source of air in communication with said constant pressure chamber of said booster unit, a source of vacuum in controlled communication with said variable pressure chamber of said booster unit through said valve means, said valve means including a manually operated air valve, a valve seat member, an air valve seat mounted on said valve seat member, a vacuum valve seat mounting on said valve seat member coaxial with said high pressure fluid valve seat, a vacuum valve element coaxial with said air valve element, the contacting surface of said air valve element with said air valve seat lying on a plane non-parallel with the plane including the contacting surface of the said vacuum valve element with said vacuum valve seat and thereby provide a tilting action of said valve seat member when said high pressure valve element contacts said valve seat member when said valve means is operated for controlling the operation of said booster unit.

6. A valve means for operation in combination with a brake booster unit including, a booster unit having a power wall forming a constant pressure chamber and a variable pressure chamber, a source of high pressure fluid in communication with said constant pressure chamber, a source of low pressure fluid in controlled communication to said variable pressure chamber through said valve means, said valve means including a valve housing formed by said power wall, a high pressure valve element coaxially mounted within said power wall, a valve seat member coaxially mounted with said valve housing having means to permit axial movement and coaxially located with said high pressure valve element, a high pressure valve seat mounted on said valve seat member, a low pressure valve seat mounted on said valve seat member concentric with said high pressure valve seat, a low pressure valve element formed on the inner periphery of said valve housing coaxially with said high pressure valve element, resilient means to bias said low pressure valve seat in contact with said low pressure valve element in its normally retracted position, resilient means to bias said high pressure valve element in spaced relation to said high pressure valve seat in its normally retracted position, a contacting surface of said high pressure valve element lying on a plane non-parallel with the plane including a contacting surface of said low pressure valve element to provide a tilting action of said valve seat member during opening of said low pressure fluid valve element with its mating seat and the closing of said high pressure valve element with its mating seat during operation of said valve means for controlling the operation of said booster unit.

7. A valve means for operation in combination with a brake booster unit including, a booster unit having a power wall dividing the interior portion of said booster unit into a constant pressure chamber and a variable pressure chamber, a source of air pressure in communication with said constant pressure chamber, a source of vacuum in controlled communication with said variable pressure chamber of said booster unit through said valve means, said valve means including a manually operated air valve element coaxially located within said power wall, a valve housing formed by said power wall, a valve seat member coaxially located within said power wall for axial movement within said power wall, a vacuum valve element formed on the inner periphery of said valve housing, an air valve seat forming a planar surface on said valve seat member, a vacuum valve seat forming a second planar surface non-parallel to the planar surface forming said air valve seat, means for biasing said valve seat member to a contacting position with said vacuum valve element when said valve means is in its normally retracted position, means for biasing said air valve element in spaced relation to its mating valve seat when said means is in its normally retracted position, said non-planar valve seat surfaces providing a tilting action of said valve seat member when said manually operated air valve is operated for controlling the operation of said valve means in operation with said booster unit.

8. A valve means for operation in combination with a brake booster unit including, a booster unit having a power wall dividing the interior portion of said booster unit into a constant pressure chamber and a variable pressure chamber, a source of air pressure in communication with said constant pressure chamber, a source of vacuum in controlled communication with said variable pressure chamber through said valve means, said valve means including, a valve housing formed by said power wall, a manually operated air valve element coaxially located within said power wall, a valve seat member coaxially located within said valve housing, a vacuum valve element formed in said valve housing coaxially within said power wall, a planar surface forming a vacuum valve seat on said valve seat member, means for biasing said valve seat member to a position where said planar surface is contacting said vacuum valve element to prevent communication of a vacuum cavity with said variable pressure chamber of said booster unit, a second planar surface forming an air valve seat non-parallel with the planar surface for said vacuum valve seat, means for biasing said air valve element in spaced relation to said second planar surface on said valve seat member thereby placing communication between said constant pressure chamber and said variable pressure chamber when said valve means is in its normally retracted position, said non-planar surfaces on said valve seat member providing a tilting action of said valve seat member when said valve means are actuated in controlling the operation of said booster unit.

9. A valve means for operation in combination with a brake booster unit including, a booster unit having the power wall dividing the interior portion of said booster unit into a constant pressure chamber and a variable pressure chamber, a source of air pressure in constant communication with said constant fluid pressure chamber, a source of vacuum in controlled communication with said variable pressure chamber through said valve means, said valve element means including, a manually operated air valve coaxially located within said power wall, a valve housing within said power wall, a vacuum valve element formed by the interior portion of said valve housing, a valve seat member coaxially mounted within said valve housing, a planar vacuum valve seat on said valve seat member, means for biasing said valve seat member so that said vacuum valve seat is contacting said vacuum valve element when said valve means is in its normally retracted position, a planar air valve seat on said valve seat member non-parallel with said vacuum valve element seat, means for biasing said air valve to an open position relative to said air valve seat when said valve means is in its normally retracted position, said vacuum valve seat and said air valve seat operating to cock said valve seat member in response to the movement of the said air valve in operation of said valve means for controlling the operation of said booster unit.

References Cited in the file of this patent
UNITED STATES PATENTS

| | | |
|---|---|---|
| 2,826,041 | Rike | Mar. 11, 1958 |
| 2,842,101 | Price | July 8, 1958 |
| 2,991,762 | Price et al. | July 11, 1961 |